Feb. 7, 1956
W. H. COULTER
2,733,604
ELECTROMAGNETIC FLOWMETER
Filed Nov. 27, 1951
3 Sheets—Sheet 1
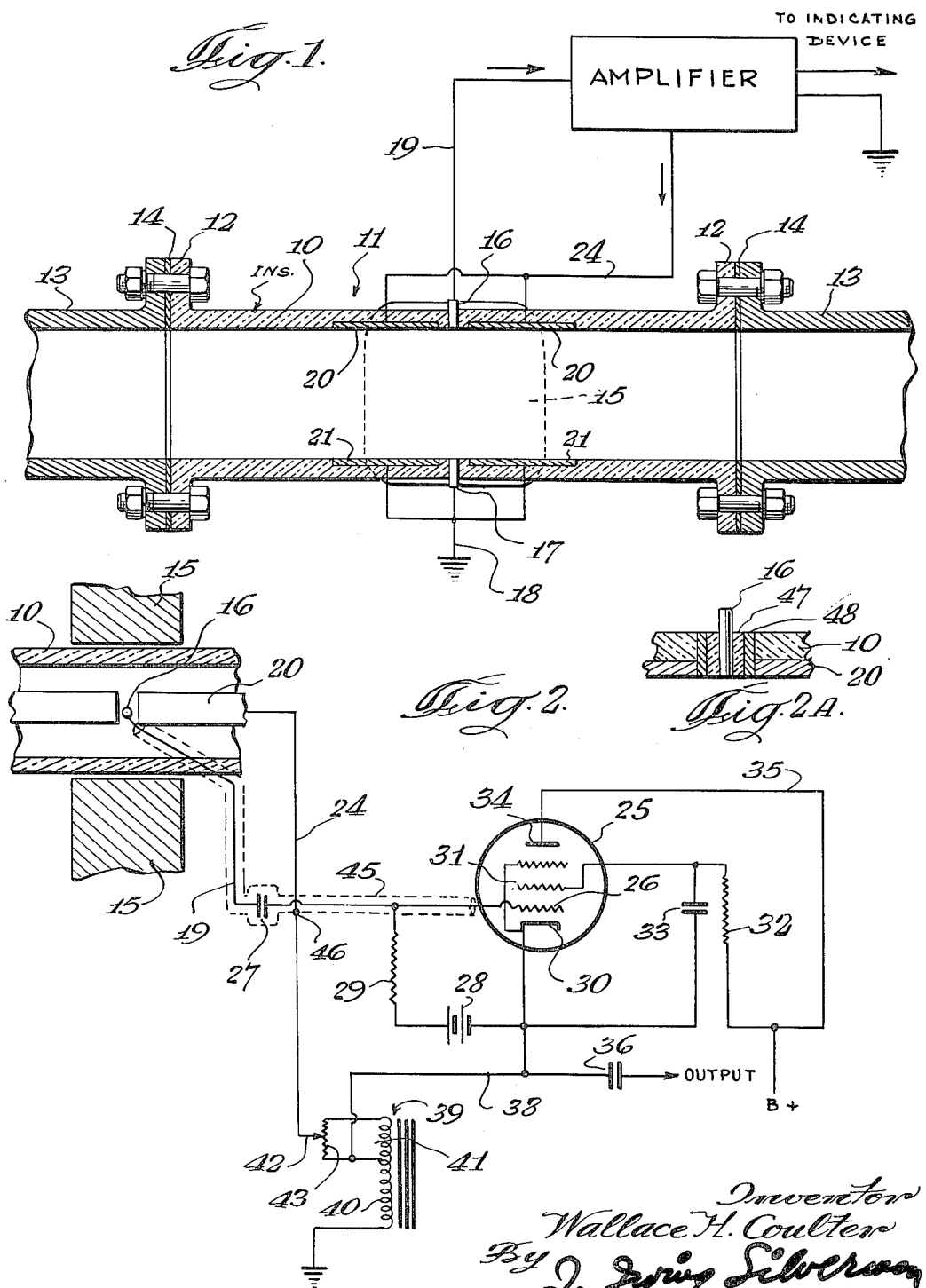
Inventor
Wallace H. Coulter
By J. Irving Silverman
Attorney

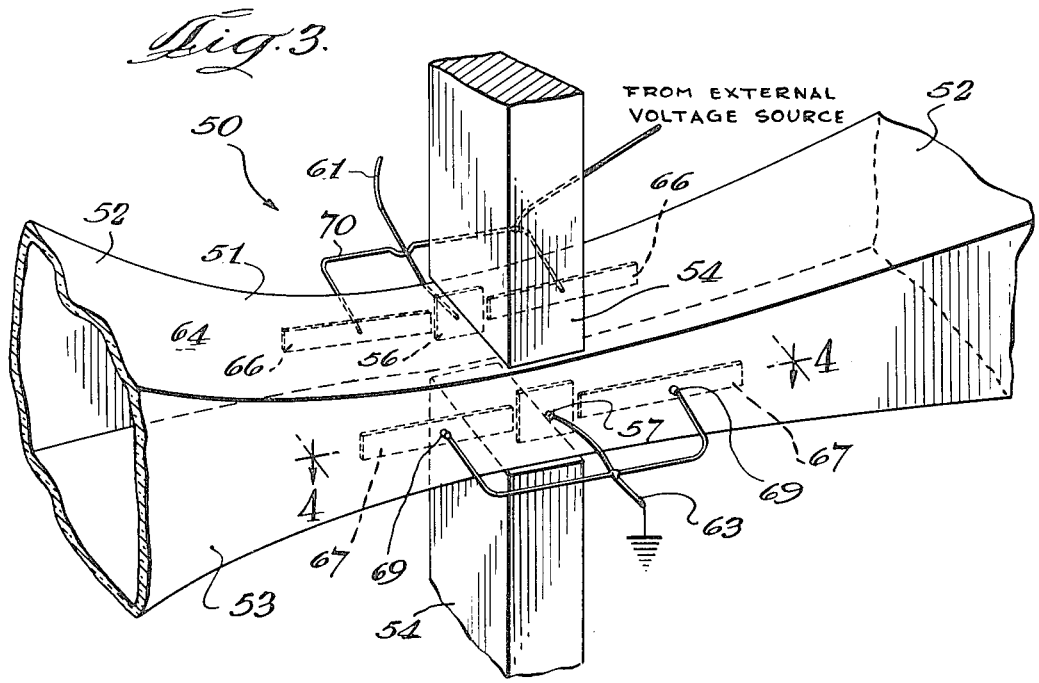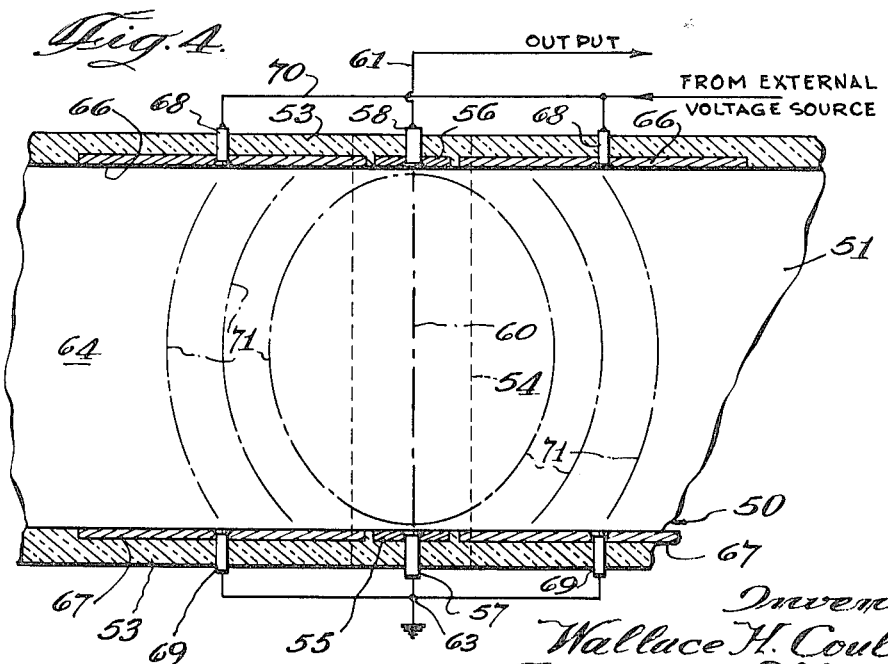

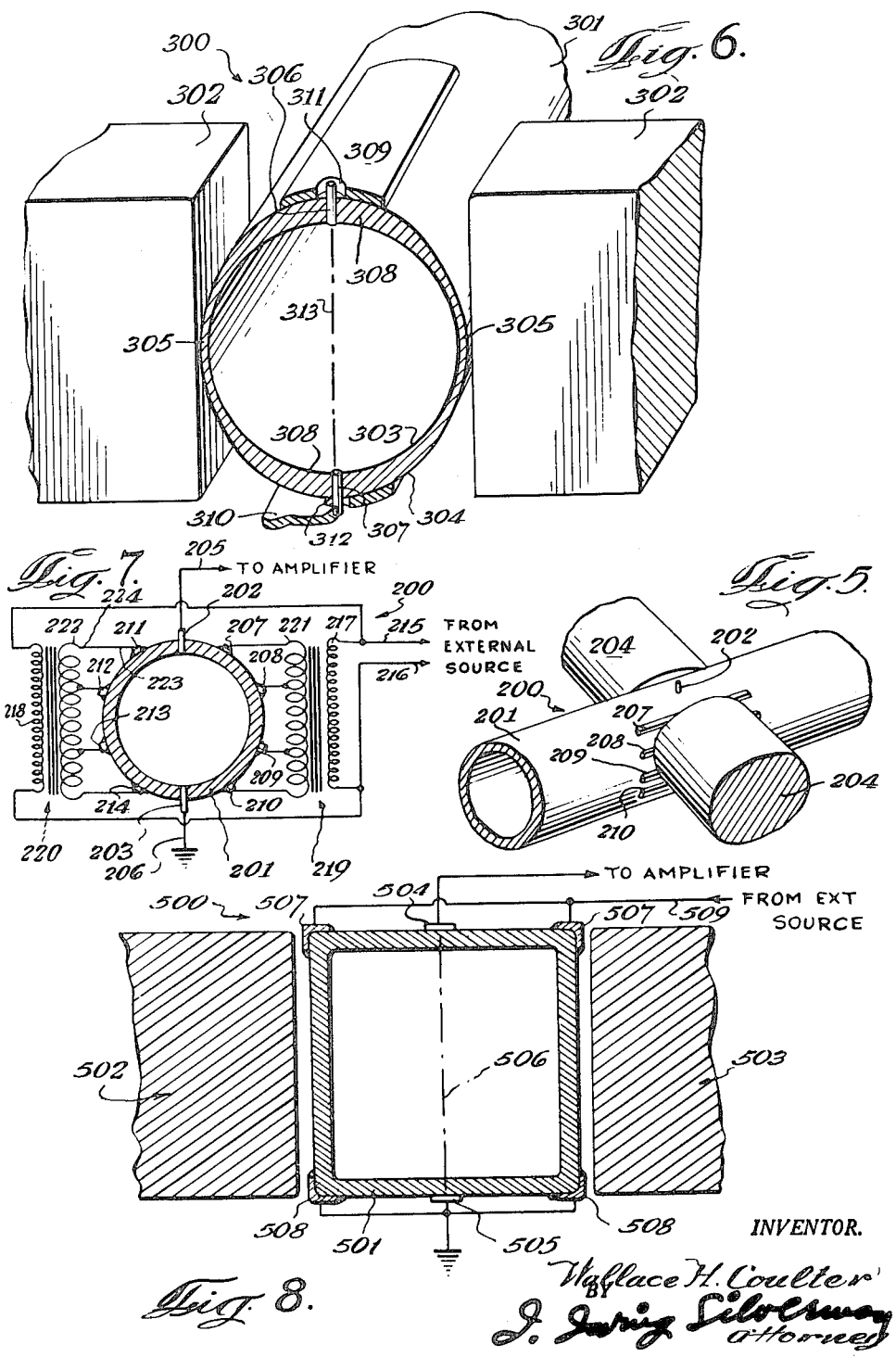

United States Patent Office 2,733,604
Patented Feb. 7, 1956

2,733,604
ELECTROMAGNETIC FLOWMETER

Wallace H. Coulter, Chicago, Ill.

Application November 27, 1951, Serial No. 258,377

30 Claims. (Cl. 73—194)

This invention relates generally to electromagnetic flow meters, and more particularly is concerned with an improved electromagnetic flow meter having greater sensitivity than heretofore achieved.

The electromagnetic flow meter consists of a conduit, preferably of insulating material, through which the fluid whose rate of flow it is desired to measure is caused to pass. An electromagnetic field is established transverse to the direction of flow so that the fluid cuts the field. It has been found that there is established in the fluid currents which produce measurable voltages whose values are substantially proportional to the rate of flow of the fluid. Accordingly, probes or similar contacts are provided at the sides of the conduit at the point of most uniform and greatest flux density; namely, the center of the electromagnetic field, to detect the voltage appearing across the fluid. The voltage between the probes occurs in a path which is at right angles to the magnetic field. The signal from these probes is fed to suitable measuring instruments, such as, for example, vacuum tube voltmeters, including amplifiers, and the like.

Accordingly it is the principal object of my invention to provide a flow meter of the electromagnetic type which has greatly increased signal voltage, thereby giving rise to the above advantages set forth.

If energy in the form of an additional voltage is supplied to the liquid stream (or duct) of the flow meter, in certain geometric relationship to the electromagnetic field and the detecting probes, the voltage available at the probes very substantially will be increased.

The purpose of this voltage supplied from an external source and the consequent current flow is to isolate the segment or column of fluid between the sensing electrodes from the shunting action of other electrical paths parallel with the segment. The sensing electrodes or probes are preferably located where the flux density is maximum, and where the flow-induced voltage is also maximum. The parallel shunting paths include segments of fluid across which there are also flow-induced voltages, albeit less than maximum, as well as segments where little or no voltage is induced. In some applications the walls or partitions of the fluid duct may also provide conductive or dielectric shunt paths having the same effect as the fluid shunt paths. These induced voltages diminish from the center of the field outward, each path being shunted by successive paths of lower voltages and lower impedances, out to the fringes of the field where the fluid generates zero voltage.

The introduction of energy to the duct serves to reduce the shunting effect, or isolates the probe area from the voltage reducing action of other electrical paths in the fluid, or even in the conduit. This is done by providing the energy for supplying the current for the shunt paths from an outside source, thereby preventing these shunt paths from robbing the energy from the signal path. One might consider that this is the equivalent of driving a juncture in an otherwise signal source loading path.

It is therefore a further important object of my invention to provide means in an electromagnetic flow meter for decreasing the shunting effects of electrical paths other than that actually being used for the measurement of induced voltage due to fluid flow.

In connection with the object set forth immediately above, different manners of carrying out the object have been devised, and ancillary to the said object it is pointed out that the invention also resides in these different means.

In supplying energy to the shunt paths for carrying out the above objects, where the value of the voltage is supplied is of the order of the voltage appearing at the detecting probes, optimum benefits are obtained. I may obtain such voltage from any suitable external source. Since the desired voltage induced in the fluid and appearing across the probes in practically every case will be fed into an amplifier, it is economical to use a signal which can be obtained from this amplifier. Furthermore, it is best that the signal which is being applied to the shunt paths of the fluid is substantially the same as the induced voltage, not only as to amplitude, but also as the frequency and phase and this type of signal is ideally obtained from the said amplifier.

Further and additional object of the invention are to provide structure for carrying out the functions enumerated in the above paragraph.

The phenomenon of shunt paths reducing available voltage at the probes of an electromagnetic flow meter, or whatever other physical occurrence giving rise to the reduced value of voltage, has placed limitations upon the construction of prior flow meters, both as to the magnet and the conduit. Flow meters of this type have thus far been constructed with circular or substantially square cross-section conduits. Under these circumstances, the magnetic pole face is approximately equal in diameter to the spacing between the pole faces. Since this spacing is equal to the diameter of the conduit, the magnetic pole in cross section is about the same configuration as the fluid conduit. This general arrangement has been found satisfactory to give a substantially uniform flux across the conduit, at least at the center of the magnet. It is an economical compromise between magnetic structure cost and low flux spreading. Larger pole faces would be desirable, if they were not more expensive than justified by the results.

It would be desirable further, for a given flow of fluid, to narrow the conduit and thereby bring the pole faces closer together. Although this would give an increase in generated voltage, at the same time it would increase the impedance of the path between the probes because the cross section is reduced and the length increased which increases the losses due to the shunt paths so that the advantages tend to cancel one another. Through my invention it is possible to isolate the probe path and offset the effects of the shunt paths, thereby increasing the voltage available at the probes manyfold, making this arrangement highly effective and desirable.

It is therefore a further object of the invention to provide a more economical flow meter, the construction of which has not heretofore been practical due to the low voltages obtained therefrom, but which, because of this invention, will provide large induced voltages with economic magnetic structures.

A further object of the invention is to provide novel circuitry for providing necessary isolating voltages in the construction described.

Many other objects and important advantages will become apparent to those skilled in the art to which the invention pertains without the necessity of my enumerating the same. As required by the patent statutes, I have explained the invention hereinafter in considerable detail in connection with certain preferred embodiments of the invention illustrated in the accompanying drawings. By virtue of such drawings and the explanation, it is believed that the contribution which has been made to the arts and sciences will be clearly manifest. No limitations are intended by the specific nature of the explanation and the illustrations since the invention certainly is capable of wide application and practice without departing from the scope of the invention as defined in the appended claims.

In the drawings:

Figure 1 is a schematic sectional view taken through a flow meter constructed in accordance with my invention with one method of applying energy to the parallel shunt paths being schematically illustrated.

Figure 2 is a fragmentary sectional view through the flow meter generally on a plane perpendicular to the illustration of Figure 1 and including a schematic circuit diagram of a means for supplying the isolating signal to the flow meter.

Figure 2a is a sectional view through the probe mounting of a modified form of the invention.

Figure 3 is a perspective view showing a portion of a flow meter of modified design in which the conduit has been considerably narrowed to increase the length of the voltage path being measured and decrease the spread of the magnetic field. The width of the magnetic structure, in direction of flow, has been made relatively small.

Figure 4 is a fragmentary sectional view taken through the embodiment shown in Figure 3, along the plane 4—4 and in the indicated direction.

Figure 5 is a perspective view, somewhat schematic in nature, showing a flow meter of the type in which the conduit is formed of a material having relatively good conductivity, constructed in accordance with my invention.

Figure 6 is a sectional view through the flow meter of Figure 5 with certain parts thereof represented schematically.

Figure 7 is a fragmentary perspective view partially in section showing a modified form of the invention embodied in a flow meter having a conduit of good conductivity and adapted to carry a fluid of the same order of conductivity.

Figure 8 is a schematic sectional view of another form of the invention in which energy is fed to the conduit walls.

The principal feature of the invention resides in the improvement of the electromagnetic flow meter as heretofore known by providing means to supply electrical energy to whatever shunting paths exist through the fluid passing through the flow meter to isolate the pick-up probe so that a greater voltage may be obtained therefrom. In most applications the shunting paths of consequence are only in the fluid. In others the conduit walls may require treatment as in the case where the impedance of the conduit walls approaches that of the fluid or is less than that of the fluid. In the case that the fluid is of much greater conductivity than the conduit, such as, for example, water flowing through a non-conductive plastic conduit, the energy which is supplied is provided by establishing voltages through the fluid parallel with the induced voltage path. In such case the flow of current in the conduit itself is negligible, and therefore the shunt paths through the conduit are also of no consequence. However, the flexibility of this type of flow meter extends as well to situations where there is a comparative relationship of conductivity between the fluid and the conduit. It may even occur that the fluid is less conductive than the conduit. In such cases it is desirable to supply energy to the conduit instead of or in addition to supplying energy to the fluid. Where the liquid impedance is high it is sometimes desirable to supply energy to the duct walls even though the walls be of insulating material since they provide a shunt dielectric path.

The theoretical induced voltage across the fluid flowing through this type of flow meter is greater than practically obtainable, since there is a shunting effect of parallel paths through resistance and capacitance conduction and this decreases the voltage which is available for measurement. Through my invention I increase the efficiency of the flow meter by reducing the effect of these shunt paths. The energy supplied to these paths from external sources is energy which would otherwise be drained from the probe path so that the flow meter is thereby increased in efficiency and made more accurate and sensitive and easier to use.

Referring now to the drawings, in Fig. 1 I have illustrated a basic form of the invention in connection with a flow meter designated generally 11. There is provided a section of conduit 10 having end flanges 12 by means of which said section is interposed in a conduit 13. Through the medium of suitable gaskets 14 and conventional fastening devices the joints are made fluid tight. The conduit 13 may be some metal pipe and the interposed section 10 may be formed of some good insulating material such as a resin or plastic not chemically affected by the fluid passing through the conduit.

The situation existing in the flow meter under circumstances where the interposed section of conduit material has much less conductivity than the fluid, such as for example an aqueous fluid passing through a section of plastic tubing, is most easily discussed and most economically improved by the invention. It is desired to emphasize that the relative conductivities of the fluid and conduit are not obstacles either to the operation of the electromagnetic flow meter or the operation of my invention. Where there is a difference of about one hundred times or more, little consideration need be given to signal loss in the conduit itself. Metering the flow of molten metal which generally requires a metal conduit is a different matter, however, as is also metering fluids of high resistivity in conduits having a dielectric constant of similar magnitude. In such a case, there will be shunting in the conduit itself, and my invention is applicable to such a flow meter in the same manner as in connection with a device as shown in Fig. 1, but with modified structure as will be explained hereinafter in connection with Figs. 10 to 15 inclusive.

Referring once more to Fig. 1, on opposite sides of the second 10 there are provided poles of an electromagnet 15 as shown in Fig. 2. There is thus established an electromagnetic field at right angles to the conduit section 10, and thus flux exists at right angles to the fluid flow. In Fig. 1 the poles 15 provide a field perpendicular to the plane of the paper, and in Fig. 2 the field is parallel with the plane of the paper. The coils and additional apparatus which are required to provide suitable establishment of the electromagnetic field are not shown since same may take a variety of forms and are well-known. The depiction of simple poles is also an attempt to render the drawings easy to understand and lucid. Obviously the poles can be configured to match the contours of the conduit section 10 and built to be quite close thereto. In the interests of further simplification, the conventional broken line symbolical representation of the flux engendered by the electromagnet 15 has not been shown since its form is known. It is obviously fairly straight line in the center between poles with outwardly bowed equi-density flux lines increasing in curvature away from the center.

Reference is made hereinafter to the magnetic field transverse of the conduit and to the electrodes which are arranged at right angles to the conduit. While the maximum flux density can be obtained by this geometric arrangement, practical structures may have the magnetic structure other than at exactly right angles to the conduit axis. The only requirement of the flow meter is that there be a component of flux at right angles to flow. For clarity, this is not referred to in every case discussed, since it is believed obvious that the invention is applicable in cases where there is a component of the field producing the signal.

The cross sectional area and general shape of the poles of the electromagnet 15 is about equal to those respectively of the conduit section 10. This has been found to be an economical and satisfactory arrangement. At the center of the poles where the flux is most uniform and the flux density is greatest, there is provided a pair of probes 16 and 17. These probes are of a conductive material such as platinum which is substantially inert insofar as the fluid is concerned, and preferably are mounted on diametrically opposed sides of the conduit section 10, and also at right angles to the electromagnetic field. They define between themselves an electrical path the voltage across which is to be measured. The probes 16 and 17, which may be considered "sensing" contacts, are preferably mounted with their inner ends flush with the inner walls of the conduit section 10 so as not to present an obstruction to the flow of fluid therein.

The bottom probe 17 is grounded as shown at 18 while the upper probe 16 may be connected to the electrical conductor 19 whereby any voltage induced by the flow of fluid across the path defined between the probes will appear as a signal from the conductor 19 to ground. This signal may be impressed upon any suitable detecting or indicating device such as for example a vacuum tube amplifier and galvanometer. I have shown the conductor 19 inserting the signal at the input of a high gain amplifier shown in block form in Fig. 1. This amplifier is shown feeding some indicating device which need not be illustrated, but which may comprise a recording galvanometer calibrated in rate of flow.

As thus far described, the flow meter 11 embodies only known structure whose nature per se it is not intended to claim as novel. Furthermore, various techniques involved in the refinement and operation of the device as described are known. For example, the size of the electrodes or probes 16 and 17 can in some measure determine the input impedance to the amplifier to affect loading thereof. Suffice it to say further that the field which is preferred is an A. C. field of a frequency which is almost invariably in the audio or sub-audio range. This simplifies the measurement of signals and eliminates polorization of electrode surfaces. Likewise in certain instances the probes may not be at the precise center of the field. Operation for certain purposes may require that the signal be reduced through orientation of the probes a distance away from maximum. The invention is equally applicable here.

The flow of fluid in a magnetic field has been found to give rise to the induction of currents in the fluid much in the same manner that a moving wire generates current while moving in a magnetic field. The succession of these currents across the conduit will cause a voltage to appear between the probes 16 and 17. This voltage, for low density fields and for low rates of flow may be of the same order as noise, namely—a few micro-volts. For strong fields and fast flows, the voltage induced may run as high as several hundred millivolts. An average field is about 1,000 gauss, and an average voltage is a millivolt or so.

Hereinafter there will be described means rendering the thus far described device highly effective and more efficient by virtue of increased sensitivity through increase of the amount of available signal. It is desired to point out that the increase in signal which may be achieved by means of my improvements to the flow meter is dependent to a great extent upon the geometry of the conduit section and magnetic field. The flow meter of Figs. 1 and 2 is so constituted that its voltage output, while increased by virtue of my invention, is not as greatly increased as in the case of other geometrical configurations of magnets and conduit, such as for example shown in Figs. 3 and 4.

I provide additional contact surfaces in the conduit section 10 to supply energy to electrical paths in the fluid which have a deleterious shunting effect upon the voltage appearing at the probes 16 and 17. The fluid obviously will induce voltages throughout the entire field of the magnet 15. There will thus be a myriad of paths generally parallel with the primary probe path or plane whose induced voltages will be less than the probe path. There will thus be a shunting of energy from the probe path or plane thereby reducing the voltage available as output. By means of the contact surfaces, which are designated 20 and 21, I apply energy to those shunt paths which would otherwise be drawn from the measured path. In other words, by substantially isolating the probe path between probes 16 and 17, I enable more of the actually induced voltage to be available to drive detecting and indicating devices. The flow meter is thus more sensitive and effective.

The surfaces 20 and 21 are arranged in the conduit section 10 on opposite sides of the respective probes 16 and 17. Like the probes they are set flush into the conduit wall to prevent obstruction to flow, although of course this is not a requirement for their electrical action. Their inner ends are close to the probes while their outer ends will generally extend well beyond the electromagnetic field. They are placed on both sides of the sensing contacts in the direction of flow.

It is appreciated that the ordinary electromagnetic flow meter using relatively wide pole faces does provide some measure of isolation between the center induced voltage path or plane and the region of zero induced voltage due to intervening paths having at least some voltage induced therein, and thus not permitting all of the energy to be shunted. It is pointed out however, that insofar as my invention is concerned, the available measured voltage is increased by a type of isolation substantially independent of the geometry of the pole faces. The energy shunted by the paths of low induced voltage is supplied to these planes or paths to permit the primary plane to "keep" practically all of its induced voltage thereby making more available to the output.

As shown in Fig. 1, the surfaces 20 are connected to the amplifier through electrical conductor 24 which provides a signal of substantially the same phase and amplitude as the signal from the output 19. The lead 24 could, however, just as well come from another source such as a second amplifier. It is best that the signal be of the same amplitude as the output signal, and this condition can be achieved by adjustment of circuit constants.

More detail of the pick-up from the amplifier is shown in Fig. 2. One stage of the amplifier is shown, same consisting principally of a pentode 25 to whose grid 26 the output from lead 19 is coupled through a suitable condenser 27. The grid 26 is biased by some biasing device such as a battery 28 in series with a grid leak resistor 29. The suppressor is conventionally supplied through resistor 32 from the B supply and by-passed to condenser 33. The plate 34 is connected to the B supply by lead 35. The output is taken from cathode 30 and coupled to the next stage (not shown) through a condenser 36. While any suitable method of obtaining a duplicate of the signal being fed to the grid may be used (and it may be picked from any succeeding stage, if desired), I have shown a cathode follower arrangement in which the signal generated between the cathode and ground is fed through lead 38 to the tap of an auto-transformer 39.

The primary 40 and the secondary 41 are related to enable a slight step-up of the signal from the amplifier. The end result desired is that the signal at the auxiliary contacts be of substantially the same amplitude as the signal generated across the sensing probes 16 and 17. The circuit shown is one of several means of accomplishing this "unity" gain condition.

The electrical lead 24 is connected to a slider 42 which is slidable upon a resistive element 43 connected across the secondary 41. This provides a fine control of the voltage being introduced to the auxiliary surfaces 20 and 21.

The output impedance of the cathode follower is quite low. It is also essential that the amplifier does not load the output of the probes 16 and 17 since this will in turn increase the shunt losses. Measures may be taken to decrease any possibility of undesirable loading. Note that the cathode 30 is not grounded so that there is very little potential between grid 26 and cathode 30 whereby low amplifier input is achieved. Further precautions may consist of surrounding the lead 19, including the coupling condenser 27, with shielding 45 which is driven by the cathode 30 through connection with lead 38, or better yet, by the output of the transformer 39 to raise its potential to a value as close as feasible to that of lead 19. Note in Fig. 2, the lead 24 is joined with shielding 45 at the juncture 46. The shield may extend well over the sensing contact lead 16 and terminate on the duct wall itself thereby providing a means of isolating the sensing probe from tube electrical surface leakage losses.

Another problem which is of importance is loading of the probes 16 by surface leakage of the conduit section 10. This can be minimized by surrounding the probes with conductive rings, spaced and insulated from the said probes, and supplied with the signal supplying the auxiliary surfaces 20 and 21. A construction of this exact nature is not fully illustrated, but the expedient of ringing the sensing electrodes is illustrated in Fig. 7 in connection with flow meters the conductivity of the conduit of which is of the same order as the conductivity of the fluid passing therethrough. In the embodiments of Figs. 1 and 2, the inner surfaces 20 might well be combined to form a single member having a circular opening in its center to accommodate the sensing probe 16. The probe 16 could be mounted in an insulating bushing 47 which in turn could be secured in a metal sleeve 48 engaged in the circular opening of the member 20. This construction is more or less diagrammatically illustrated in Fig. 2a.

The flow meter 11 is somewhat of the conventional type heretofore used in which the shape of the magnet poles is of about the same dimensions as the conduit cross section. The improvement in signal by virtue of the provision of energy to the shunting paths is quite marked but not as relatively great as in the case of the constructions to be described. In the flow meter of Figs. 1 and 2, improvements up to about 100% may be expected depending on the exact construction, while in the case of the flow meter of Fig. 3 this improvement may be increased many times.

Referring now to Figs. 3 and 4, it will be seen that the flow meter 50 represented there uses a restricted conduit section 51 which is flattened to provide an elongated rectangular cross section. The ratio of dimensions of the long to the short sides is substantially greater than unity. Gradual tapering is depicted at the ends 52 of the section 51 to signify that an effort is made from the hydraulic point of view to minimize pressure loss due to the insertion of the measuring section 51. Contact surfaces are provided on the inside of the short sides 53 centered with respect to the magnet poles 54 and the flux produced thereby. These probes or contact surfaces are here shown as flush mounted plates 55 and 56 which have contact members 57 and 58 respectively leading to the outside of the conduit section. These probes have been shown of larger contact surface than the probes 16 and 17 to illustrate a type of sensing contact which provides lower impedance across the voltage generating path which is indicated by the broken line 60. The probe 56 is connected with an electrical lead 61 which is one output terminal, the other probe 55 being grounded at 63.

It should be appreciated that this type of arrangement is one which enables an economical magnetic structure. The width of the poles 54 is about equal to the dimension of the short side 53 of the conduit section 51, while the length of the poles is equal to the dimension of the long side 64 of the conduit section. The field here is much better because it is of a higher density for a given weight of magnetic structure and there is less spread, and hence there is greater potential voltage available. Further, the length of the path along which the voltage is induced, for the equivalent magnetic weight of an arrangement constructed in accordance with Figs. 1 and 2, is increased many times, thereby increasing the potential voltage by this factor. The difficulty with this construction is that not only is the impedance of the probe path increased by the same factor, thereby increasing the effective impedance of the column of fluid in which the voltage is induced, but also there is very little isolation between the zero voltage zones and the zone of desired induced voltage. In other words, the wider magnetic field of the usual structures provides a gradual diminishing of the shunting zones so that although there is loss of energy to these zones, it is not as serious as in the case where the field is narrow. The former provides more isolation for the probe path 60.

Through the use of auxiliary contacts or surfaces which supply energy to the shunting zones and thereby permit the principal or probe path to retain its induced or generated voltage, I am able to increase the signal a great many times over normal. Thus, the narrow conduit construction is practical for use and has great efficiency and applicability providing of course the pressure effects of such arrangement are not of too great importance.

Elongated surfaces 66 and 67 are flush mounted on the inside of the walls 53 close to the respective probes 55 and 56 and extending outwardly therefrom parallel with the fluid flow. Contact members 68 and 69 enable the surfaces to be fed from some external voltage source. Conveniently the surfaces 67 are grounded and the surfaces 66 are connected to an electrical lead 70 which connects with the external voltage source. This, of course, could be a part of the amplifier receiving the output from the probes or sensing contacts 55 and 56.

For illustrative purposes, I have shown theoretical low impedance and low induced voltage shunt paths which occur in this particular construction in broken lines 71 of Fig. 4. The shunting effect of these paths is alleviated by supplying energy thereto in the manner described.

Other constructions utilizing narrowed conduits to obtain greater voltage output can be devised, including structures in which the magnetic flux path traverses the fluid path more than once. Obviously the principals of the invention are applicable irrespective of the geometric arrangement of electrodes, fields, and conduits, and irrespective of the number of flux paths traversed.

In Figs. 5 and 6 I have illustrated another flow meter designated generally 200. This type of flow meter is useful in connection with fluids which are of such nature that the difference in conductivity between the fluid and the conduit necessary for transporting the same is not great. We can consider for example, a molten metal, such as for example lead, flowing through a conduit of non-magnetic stainless steel which, although its conductivity is not as great as that of the fluid, nevertheless is substantial. In such cases the sensing contacts may consist merely of the conduit wall itself. Thus in Figs. 5 and 6 I have shown a conduit 201 of generally circular cross section formed of some suitable material such as non-magnetic stainless steel and having metal binding posts 202 and 203 secured to the upper and lower sides of the conduit. A magnetic field is set up in the conduit transverse to the direction of flow and at right angles to the path defined between the sensing contacts 202 and 203. This is accomplished by any suitable means such as for example the magnetic poles 204 which may be part of an electromagnetic apparatus of suitable construction.

The sensing electrode 202 is connected by lead 205 to some indicating device such as for example a galvanometer including an amplifier. The lower electrode or probe 203 is connected to ground at 206.

The walls of the conduit 201 will provide the shunt paths hereinabove referred to and decrease the useful voltage available at the probes unless some measure is adopted to prevent this. In accordance with my invention it is possible to supply the walls with energy in the same manner as supplied in the embodiments heretofore described, and it is also plausible to supply such energy to the fluid itself, if desired.

Thus, contact bars of very low resistance are fastened about the conduit walls on the exterior thereof, spaced about the conduit and centered about the contact probes. I have shown the bars 207, 208, 209, 210, on the right hand side of the conduit as viewed in Fig. 6 and the opposite bars 211, 212, 213 and 214 all being securely welded or brazed to the conduit walls to establish good electrical contact therewith. The bars are several pipe diameters long in order to extend well out of the field of the magnetic structure 204. The bars are then connected through suitable electrical leads to potential points from the external source.

The signal from the external source may be picked up in any suitable manner by leads 215 and 216 which are connected to the opposite terminals of the primaries 217 and 218 of two step-down transformers 219 and 220 respectively. These transformers should have a large impedance ratio in the case where the walls of the conduit 201 have very low resistance in order to obtain sufficient current from an economical amplifier system. The secondaries 221 and 222 each have a plurality of taps to which the respective bars are connected in order to distribute the voltage along the conduit walls in the same manner that the voltage is distributed along the path defined between the electrodes 202 and 203. Thus, the voltage between bars 207 and 208 should be less than the voltage between the bars 208 and 209 because the projected distance defined along the actual induced voltage path through the fluid between the bars 207 and 208 is less than that defined by the bars 208 and 209. The number of windings of the secondary between the taps for bars 207 and 208 should thus be less than the number of windings between taps for bars 208 and 209.

In like manner the voltages applied to the shunting bars along the paths through the conduit walls should be adjusted so that the gradient along the shunt path equals as closely as possible the gradient along the actual induced voltage path, the latter of course being approximately uniform.

The leads between taps and bars should be very short and of very heavy metal to keep resistivity low. One of such leads is designated 223 for illustrative purposes, and the tap of the secondary to which said lead is connected is designated 224.

In Fig. 7 I have illustrated a modified form of the invention useful in place of the device illustrated in Figs. 5 and 6, i. e., where the conductivity of the conduit walls is of material importance. Thus there is shown a flow meter 300 in which the conduit 301 is disposed between the poles 302 of some magnetic structure for supplying a suitable magnetic field to the fluid flowing through the conduit. The bore 303 of the conduit is circular, but the external surface 304 has an elliptical cross section configuration. The thinner portions 305 are located at the center of the magnetic field, which in this instance is parallel with the plane of the paper and aligned along the conduit 301 with the sensing probes 306 and 307. The thick portions 308 are at the top and bottom of the conduit, the probes being set into those thickened portions. The auxiliary surfaces 309 and 310 are welded or brazed or otherwise secured to the conduit along its upper and lower sides at the thickened portions 308 of the walls of the conduit 301. These surfaces are in the form of elongate strips of metal having very low conductivity extending well out of the field of the magnetic structure 302. At their centers the metal strips 309 and 310 have circular openings 311 and 312 respectively so that the probes are surrounded by rings of the metal from which the auxiliary metal strips are made. Aside from the advantages of preventing surface leakage, the arrangement is convenient and compact.

It has been explained that there is a necessity of distributing the voltages obtained from the external source along the walls of the conduit in such a manner that the projection thereof on the rectilinear probe path defined between probes 306 and 307 (and diagrammatically indicated by the broken line 313) will result in a distribution substantially equal to the distribution of the induced voltage along the path 313. This has been done by a step distribution in flow meter 200, but the ideal arrangement would be one in which the actual incremental voltage along the shunt paths matches the incremental voltage along the measured path. This has been done in the flow meter 300 by providing shunt paths whose impedance varies inversely as the desired distribution. The thickness of the walls of the conduit considered along circumferential paths can be varied so that the incremental voltages along the path will be approximately equal to the voltages along the measured path. At the point of least curvature the impedance is greatest and voltage is highest. At the point of greatest curvature, the impedance is least and the voltages in the shunt path are least.

The above described construction eliminates the necessity for bars and tap feeding transformers, since the voltage from the external source is applied directly, or through a suitable simple transformer, to the contact strips 309 and 310.

In Fig. 8 there is illustrated in section a practical and economical embodiment of the invention in which the flow meter 500 utilizes a rectangular cross sectional conduit 501 here shown in the field between the poles 502 and 503. The fluid flowing in the conduit and the material from which the conduit is formed will be presumed to have such conductivity relationship that it is desirable to apply the signal from the external source through the conduit walls. The sensing electrodes are shown at 504 and 505 mounted to form a path 506 along which the induced signal is measured. Elongate angle-shaped members 507 and 508 of highly conductive material are welded to the corners of the conduit 501. The members 507 are connected by lead 509 to the external source of voltage and members 508 may be grounded as shown. The device operates as the flow meter 200 of Fig. 6, except that voltage distribution in the side walls of the conduit 501 will approximate that along path 506 without requiring additional bars or special structure.

The use of electromagnetic flow meters has somewhat been limited heretofore by reason of the great expense thereof, especially in connection with the detecting apparatus. With my new invention, the amount of voltage available is increased and certain magnetic structures, heretofore not practical, and in many cases not suitable, can be used. These magnetic structures enable greater voltages to be achieved, enable more compact and economical arrangements to be devised, and result in great benefits by enabling the construction of cheaper apparatus.

No effort has been made to describe special means for reducing extraneous interference voltage effects, etc. For example, the invention has simply and conveniently been described in all the embodiments with "single-end" outputs instead of push-pull which is frequently favored as means for eliminating signals not due to flow only. The invention contemplates the use of such means and others within the realm of good electronic engineering practice.

It is also believed not necessary to point out precautions to prevent thermocouple effect where the fluid is subject to great variations of temperature. In such cases the leads, probes and conduit walls should be of the same metal. Other techniques will suggest themselves.

I would emphasize that the nature of the invention is such that it is difficult to set forth all of the applicable structures with which the same is capable of being practiced. It follows therefore, that the embodiments illustrated are merely illustrations and examples rather than limiting structures circumscribing the scope of the invention. I would further emphasize that my invention may be considered embodied in methods which have been set forth in some detail, and which may be practiced by the use of varied types of apparatus. I do not wish to be limited by anything shown and described, except insofar as set forth in the appended claims.

While the theory of electromagnetic flow meters has been set forth by others and is known among those skilled in the art, I do not wish to be limited in the scope of the invention by virtue of having espoused such theories. My acceptance thereof and the explanations given herein is a way of presenting the exact nature of my invention in a clear and easily understood manner. In addition to the above, the theories which I have myself advanced as to the reasons for an increase in the voltage output of the flow meters achieved through the practice of my invention and the apparatus described, are not intended to be considered limiting. Irrespective of the physical causes of the invention achieving the salutary advantages and results set forth, I desire my coverage to be coextensive to the structures described and the steps follow all as set forth in the claims.

What I desire to claim by Letters Patent of the United States, and what I believe to be the advances I have made in the arts and sciences is:

1. In a flow meter of the magnetic type which includes a fluid-carrying conduit, means establishing a magnetic field transverse of the line of flow of said fluid and the conduit, at least a pair of conducting probes across a portion of the fluid at a position of high field density providing a voltage measuring path therebetween transverse of the line of flow and the field, the herein invention which comprises means for applying electrical energy to parasitic paths shunting the measuring path to prevent loss of induced voltage to said parasitic paths and comprising auxiliary conducting probes spaced from said first conducting probes along the line of flow and in the vicinity of said parasitic paths and having an external source of voltage connected thereto and driving same.

2. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductively greater than that of the conduit, secured to the conduit walls in the vicinity of the respective probes and adapted to have an external source of voltage connected thereto.

3. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have an external source of voltage connected thereto, said surfaces defining paths substantially parallel with the measuring path and having portions thereof in the field at said high point and other portions at points of greatly lessor field density.

4. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have an external source of voltage connected thereto, said surfaces being secured to said walls on opposite sides of the conduit relative to the said measuring path, and comprising conducting strips of elongate formation arranged parallel with the line of flow of the conduit.

5. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have an external source of voltage connected thereto, said surfaces being secured to said walls on opposite sides of the conduit relative to the said measuring path, and comprising conducting strips of elongate formation arranged parallel with the line of flow of the conduit, and extending from substantially the zero density portion of one side of the field, past the center of the field to the zero density portion of the opposite side of the field.

6. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have the external source of voltage connected thereto, and said probes each being surrounded by a ring of the same material as said contact surfaces and being connected with the respective surface in the vicinity thereof.

7. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have the external source of voltage connected thereto, said surfaces being disposed on the interior of the conduit in contact with fluid.

8. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have an external source of voltage connected thereto, said surfaces comprising metal members on the exterior surface of the conduit and bonded thereto.

9. In a flow meter of the character described which includes a fluid-carrying conduit, a pair of voltage pick-up probes in said conduit at opposite sides thereof, means establishing a magnetic field transverse of the flow and at the location of the pick-up probes whereby a voltage will be generated in the field by the flow thereof and appear across the probes, one probe being at higher potential than the other when said voltage is generated, means for increasing the voltage available at the probes which comprises, elongate metal strip means secured to the said conduit adjacent the respective probes and extending from the position of the probes on opposite sides thereof to substantially beyond the field, the means on opposite sides of the conduit being substantially coextensive one with the other, at least the strip means on the side with the higher potential probe being insulated from said probe, and means for applying across the said strip means a voltage of substantially the same character as the voltage generated across the probes.

10. In a flow meter of the character described which includes a fluid-carrying conduit, a pair of voltage pick-up probes in said conduit at opposite sides thereof, means establishing a magnetic field transverse of the flow and at the location of the pick-up probes whereby a voltage will be generated in the field by the flow thereof and appear across the probes, one probe being at higher potential than the other when said voltage is generated, means for increasing the voltage available at the probes which comprises, elongate metal strip means secured to the said conduit adjacent the respective probes and extending from the position of the probes on opposite sides thereof to substantially beyond the field, the means on opposite sides of the conduit being substantially coextensive one with the other, at least the strip means on the side with the higher potential probe being insulated from said probe, and means for applying across the said strip means a voltage of substantially the same character as the voltage generated across the probes, comprising leads and an external voltage source, the leads connecting the low potential side to the strip means on the side of the conduit with the low potential probe, and connecting the high side of the said source to the strip means on the opposite side of the conduit.

11. A structure as defined in claim 9 in which the conductivity of the fluid and conduit are of the same order and the said strip means comprising metal members of greater conductivity than the fluid electrically connected on the outside of the conduit.

12. A structure as defined in claim 11 in which the said strip means are connected to a source of voltage of the same character as the voltage generated, and there is a low impedance transformer between the source and said strip means.

13. In combination, a magnetic flow meter comprising a fluid-carrying conduit, means establishing a magnetic field transverse of the line of flow, a pair of sensing electrodes on opposite sides of the conduit and defining therebetween a voltage measuring path for voltage generated through flow of fluid, an electric detecting instrument connected with the said probes for detecting and measuring the potential across the probes, a lead connected to a potential point of said instrument, means including said lead providing a signal output from the said instrument of substantially the same phase and amplitude as said potential across the probes, highly conductive strip means arranged on opposite sides of the said conduit, there being strip means adjacent each probe and extending along the conduit parallel to the direction of flow and having lengths substantially greater than the ordinary width of the field, at least one probe being electrically isolated from the strip means in its vicinity, the signal output from the instrument being connected across the said conduit to the said strip means to provide electrical energy to paths shunting the said voltage measuring path.

14. In a flow meter of the magnetic type which includes a fluid-carrying conduit, means establishing a magnetic field transverse of the line of flow of said fluid and the conduit, a pair of probes at a point of optimum field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have an external source of voltage connected thereto, said surfaces defining electrical paths substantially geometrically parallel with the measuring path and having portions thereof in the field at said optimum point and other portions at points of greatly lesser field density.

15. In combination, a magnetic flow meter comprising a fluid-carrying conduit, means establishing a magnetic field transverse of the line of flow, a pair of sensing electrodes on opposite sides of the conduit and defining therebetween a voltage measuring path for voltage generated through flow of fluid, an electric detecting instrument connected with the said probes for detecting and measuring the potential across the probes, a lead connected to a potential point of said instrument, means including said lead providing a signal output from the said instrument of substantially the same phase and amplitude as said potential across the probes, highly conductive strip means arranged on opposite sides of the said conduit, there being strip means adjacent each probe and extending along the conduit parallel to the direction of flow and having lengths substantially greater than the ordinary width of the field, at least one probe being electrically isolated from the strip means in its vicinity, the signal output from the instrument being connected across the said conduit to the said strip means to provide electrical energy to paths shunting the said voltage measuring path, said strip means being bonded to the conduit on the outside surface thereof whereby to establish electrical paths in the walls of the conduit.

16. In combination, a magnetic flow meter comprising a fluid-carrying conduit, means establishing a magnetic field transverse of the line of flow, a pair of sensing electrodes on opposite sides of the conduit and defining therebetween a voltage measuring path for voltage generated through flow of fluid, an electric detecting instrument connected with the said probes for detecting and measuring the potential across the probes, a lead connected to a potential point of said instrument, means including said lead providing a signal output from the said instrument of substantially the same phase and amplitude as said potential across the probes, highly conductive strip means arranged on opposite sides of the said conduit, there being strip means adjacent each probe and extending along the conduit parallel to the direction of flow and having lengths substantially greater than the ordinary width of the field, at least one probe being electrically isolated from the strip means in its vicinity, the signal output from the instrument being connected across the said conduit to the said strip means to provide electrical energy to paths shunting the said voltage measuring path, said strip means being bonded to the conduit on the outside surface thereof whereby to establish electrical paths in the walls of the conduit and comprising metal bars spaced along the periphery of the conduit.

17. In combination, a magnetic flow meter comprising a fluid-carrying conduit, means establishing a magnetic field transverse of the line of flow, a pair of sensing electrodes on opposite sides of the conduit and defining therebetween a voltage measuring path for voltage generated through flow of fluid, an electric detecting instrument connected with the said probes for detecting and measuring the potential across the probes, a lead connected to a potential point of said instrument, means including said lead providing a signal output from the said instrument of substantially the same phase and amplitude as said potential across the probes, highly conductive strip means arranged on opposite sides of the said conduit, there being strip means adjacent each probe and extending along the conduit parallel to the direction of flow and having lengths substantially greater than the ordinary width of the field, at least one probe being electrically isolated from the strip means in its vicinity, the signal output from the instrument being connected across the said conduit to the said strip means to provide electrical energy to paths shunting the said voltage measuring path, said strip means being bonded to the conduit on the outside surface thereof whereby to establish electrical paths in the walls of the conduit and comprising metal bars spaced along the periphery of the conduit, the conduit being substantially circular in cross section and the signal output from the said instrument being distributed to the said bars so that the incremental voltages between bars substantially matches the geometrical projection of the incremental voltage along the measured path upon the periphery between the respective bars.

18. In a flow meter of the character described, which includes a fluid carrying conduit, means establishing a magnetic field at right angles to the line of flow, a pair of sensing electrodes on opposite sides of the conduit and defining therebetween a voltage measuring path for voltage generated through flow of fluid, means for supplying electrical energy to the electrical paths shunting the voltage measuring path whereby to increase the signal available thereat, including an external source of voltage of substantially the same amplitude and frequency and phase and means for applying the voltage to the conduit walls so that the energy thereof will be applied to said walls.

19. In a flow meter of the character described, which includes a fluid carrying conduit, means establishing a magnetic field transverse of the line of flow, a pair of sensing electrodes on opposite sides of the conduit and defining therebetween a voltage measuring path for voltage generated through flow of fluid, means for supplying electrical energy to the electrical paths shunting the voltage measuring path whereby to increase the signal available thereat, including an external source of voltage of substantially the same amplitude and frequency and phase and means for applying the voltage to the conduit walls so that the energy thereof will be applied to said walls, said walls having elongate conducting means bonded thereto and having said voltage impressed thereacross in paths substantially electrically parallel with the voltage measuring path.

20. In a flow meter of the character described, which includes a fluid carrying conduit, means establishing a magnetic field transverse of the line of flow, a pair of sensing electrodes on opposite sides of the conduit and defining therebetween a voltage measuring path for voltage generated through flow of fluid, means for supplying electrical energy to the electrical paths shunting the voltage measuring path whereby to increase the signal available thereat, including an external source of voltage of substantially the same amplitude and frequency and phase and means for applying the voltage to the conduit walls so that the energy thereof will be applied to said walls, said conduit having means distributing the voltage along the sides thereof so that the incremental voltage between any two given points on the periphery will be substantially the same as the incremental voltage between the same two points projected on the voltage measuring path.

21. In a flow meter of the character described, which includes a fluid carrying conduit, means establishing a magnetic field transverse of the line of flow, a pair of sensing electrodes on opposite sides of the conduit and defining therebetween a voltage measuring path for voltage generated through flow of fluid, means for supplying electrical energy to the electrical paths shunting the voltage measuring path whereby to increase the signal available thereat, including an external source of voltage of substantially the same amplitude and frequency and phase and means for applying the voltage to the conduit walls so that the energy thereof will be applied to said walls, said conduit having means distributing the voltage along the sides thereof so that the incremental voltage between any two given points on the periphery will be substantially the same as the incremental voltage between the same two points projected on the voltage measuring path, said means comprising a plurality of parallel bars spaced along the periphery of the conduit walls and each being connected to a tap of a voltage distributing means, said external voltage being connected to the distributing means.

22. In a flow meter of the character described, which includes a fluid carrying conduit, means establishing a magnetic field transverse of the line of flow, a pair of sensing electrodes on opposite sides of the conduit and defining therebetween a voltage measuring path for voltage generated through flow of fluid, means for supplying electrical energy to the electrical paths shunting the voltage measuring path whereby to increase the signal available thereat, including an external source of voltage of substantially the same amplitude and frequency and phase and means for applying the voltage to the conduit walls so that the energy thereof will be applied to said walls, said conduit having means distributing the voltage along the sides thereof so that the incremental voltage between any two given points on the periphery will be substantially the same as the incremental voltage between the same two points projected on the voltage measuring path, said means comprising a pair of highly conductive bars having said external source of voltage connected across the same and being located on said conduits at the positions of the said sensing electrodes the cross sectional configuration of the conduit being such that the volume of material is distributed between the said bars to provide incremental impedance varying in inverse relation with the desired incremental voltage distribution in said walls.

23. In a flow meter of the character described, which includes a fluid carrying conduit, means establishing a magnetic field transverse of the line of flow, a pair of sensing electrodes on opposite sides of the conduit and defining therebetween a voltage measuring path for voltage generated through flow of fluid, means for supplying electrical energy to the electrical paths shunting the voltage measuring path whereby to increase the signal available thereat, including an external source of voltage of substantially the same amplitude and frequency and phase and means for applying the voltage to the conduit walls so that the energy thereof will be applied to said walls, said conduit having means distributing the voltage along the sides thereof so that the incremental voltage between any two given points on the periphery will be substantially the same as the incremental voltage between the same two points projected on the voltage measuring path, said conduit being substantially rectangular in cross section and having the sensing electrodes in the center of opposite faces, and said voltage distributing means comprising bars bonded at the corners of the conduit and having the external source of voltage connected thereto to form paths parallel with the voltage measuring path in the side walls connected between said opposite faces.

24. In a flow meter of the magnetic type which includes a fluid-carrying conduit, means establishing a magnetic field transverse of the line of flow of said fluid and the conduit, a pair of probes at a point of optimum field density for providing a voltage measuring path at right angles to the line of flow and the field, the herein invention which comprises means for applying electrical energy to paths shunting the measuring path to prevent loss of induced voltage to said paths, comprising auxiliary contact surfaces of conductivity greater than that of the conduit, secured to the conduit walls in the vicinity of the respective probes and adapted to have an external source of voltage connected thereto, said surfaces being secured to said walls on opposite sides of the conduit relative to the said measuring path, and comprising conducting strips of elongate formation arranged parallel with the line of flow of the conduit, and extending from substantially the zero density portion of one side of the field, past the center of the field to the zero density portion of the opposite side of the field, said conduit having a gradually narrowed throat with generally rectangular cross sectional configuration, the said probes and conducting strips being located on the narrow sides and the field establishing means including magnetic poles extending across the wider sides.

25. In a flow meter of the magnetic type which includes a fluid-carrying conduit, means establishing a magnetic field transverse of the line of flow of said fluid and the conduit, a pair of probes at a point of high field density for providing a voltage measuring path at right angles to the line of flow and the field, the herein invention which comprises means for applying electrical energy to paths shunting the measuring path to prevent loss of induced voltage to said paths, comprising auxiliary contact surfaces secured to the conduit walls in the vicinity of the respective probes and adapted to have an external source of voltage connected thereto.

26. A structure as described in claim 25 which includes a detecting device connected with said probes and comprising a source of voltage connected with said auxiliary contact surfaces so as to supply said voltage from said detecting device.

27. A structure as described in claim 26 in which the detecting device is an electronic amplifier.

28. A structure as described in claim 26 in which means are provided in the detecting device to supply to said auxiliary contact surfaces a signal of substantially the same amplitude and phase as that appearing at the probes.

29. In a flow meter of the character described, which includes a fluid carrying conduit, means establishing a magnetic field transverse of the line of flow, a pair of sensing electrodes spaced apart in the said field at points of different potential and defining therebetween a voltage measuring path for voltage generated through flow of the fluid through said magnetic field, means for supplying electrical energy to the electrical paths shunting the voltage measuring path whereby to increase the signal available, including an external source of voltage of substantially the same electrical characteristics as that being measured, and means for applying the voltage to the shunting paths comprising additional electrodes connected to said source spaced along the conduit from said sensing electrodes and positioned on the conduit walls in the vicinity of said shunting paths.

30. A structure as described in claim 29 in which the electrical conductivity of said fluid and said conduit is of the same order, and in which the shunting paths are formed by the walls of the conduit, and the additional electrodes comprise members of lower conductivity than the conduit engaged to the walls and extending outside of the magnetic field.

References Cited in the file of this patent

UNITED STATES PATENTS 2,149,847    Kolin  ------------------ Mar. 7, 1939

OTHER REFERENCES

An Alternating Field Induction Flowmeter, A. Kolin, The Review of Scientific Instruments, vol. 16, No. 5 May 1945, pp. 109–116.